US008036946B2

(12) United States Patent
Angell et al.

(10) Patent No.: US 8,036,946 B2
(45) Date of Patent: Oct. 11, 2011

(54) SYSTEM AND METHOD FOR MAKING AN INFERENCE BASED ON CUMULATIVE DATA

(75) Inventors: Robert Lee Angell, Salt Lake City, UT (US); Vinod A. Bijlani, Pune, IN (US); Jack Chen, YongHe (TW); Robert R. Friedlander, Southbury, CT (US); James R. Kraemer, Santa Fe, NM (US); Le Gang Wu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 12/264,963

(22) Filed: Nov. 5, 2008

(65) Prior Publication Data

US 2010/0114660 A1 May 6, 2010

(51) Int. Cl.
*G06Q 30/00* (2006.01)
*G06E 1/00* (2006.01)
*G06E 3/00* (2006.01)
*G06F 15/18* (2006.01)
*G06G 7/00* (2006.01)

(52) U.S. Cl. .................. 705/26.1; 705/26.62; 706/21
(58) Field of Classification Search .................. None
See application file for complete search history.

(56) References Cited

U.S. PATENT DOCUMENTS

| 5,729,697 A | 3/1998 | Schkolnick et al. |
| 7,357,316 B2 | 4/2008 | Heckel et al. |
| 2002/0111852 A1 | 8/2002 | Levine |
| 2008/0059297 A1 | 3/2008 | Vallier et al. |
| 2009/0006295 A1* | 1/2009 | Angell et al. .................. 706/21 |

OTHER PUBLICATIONS

Smart Shopping Carts to Roam Grocery Stores of Future. Health and Behavior. USAToday.com. [online]. 2 pages. Posted: Oct. 26, 2003. [retrieved on Jul. 21, 2008]. Retrieved from the Internet:< URL: http://www.usatoday.com/news/science/2003-10-26-shop-smart_x.htm>.

* cited by examiner

*Primary Examiner* — Ryan Zeender
*Assistant Examiner* — Paul Danneman
(74) *Attorney, Agent, or Firm* — Schmeiser, Olsen & Watts; John Pivnichny

(57) ABSTRACT

A method for making an inference based on cumulative data. The method utilizes video, audio, and biometric devices to observe a retail environment for the presence of a customer. Once a customer is present, the method identifies every cohort to which the customer corresponds. Next, the method observes the customer as they peruse aisles in the retail environment. When the customer selects a product, the method identifies the selected product and searches the cohorts for alternate products to offer the customer. The method offers one alternate product to the customer and records to the cohorts whether the customer thereinafter accepts the method's offer and selects the alternate product or rejects the method's offer and continues perusing the retail environment aisles. The method continues observing the customer and offering alternate product until the customer leaves the retail environment.

25 Claims, 2 Drawing Sheets

SYSTEM AND METHOD FOR MAKING AN INFERENCE BASED ON CUMULATIVE DATA

BACKGROUND OF THE INVENTION

The present invention relates generally to determining product compatibility in a retail environment, and more particularly to making an inference based on cumulative data.

Retail stores contain discrete products spread out throughout the store. Conventionally, notifying customers about related products, complimentary products, conflicting items, missing products, etc., occurs during checkout. At best this practice leads to the consumer wandering the retail store in search of the appropriate product. Worst case scenario the customer purchases the mismatched product resulting in future returns, replacements, and frustration.

SUMMARY OF THE INVENTION

The present invention provides a method for making an inference based on cumulative data, said method comprising:

observing a retail environment for a customer, said observing utilizing at least one device selected from the group comprising video and audio and biometric devices;

in response to having identified said at least one customer, identifying at least one cohort corresponding to said customer, each cohort of said at least one cohort comprising a group of identifiable entities sharing at least one common characteristic, each cohort of said at least one cohort further comprising cumulative data corresponding to purchases made in said retail environment by each identifiable entity in said group corresponding to said cohort;

in response to having identified said at least one cohort corresponding to said customer, identifying at least one product said customer selected from said retail environment;

in response to having identified said at least one product, making an inference based on said at least one product and said cumulative data residing in each cohort of said at least one cohort corresponding to said customer; and in response to said making said inference, updating said cumulative data residing in each cohort of said at least one cohort corresponding to said customer, said updating comprising utilizing said inference.

DETAILED DESCRIPTION OF THE DRAWINGS

Definitions

The term 'cohort' as used herein means a group of identifiable entities whom share at least one common characteristic.

The term 'retail environment' as used herein means an establishment having a primary purpose of selling goods to customers.

Specification

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
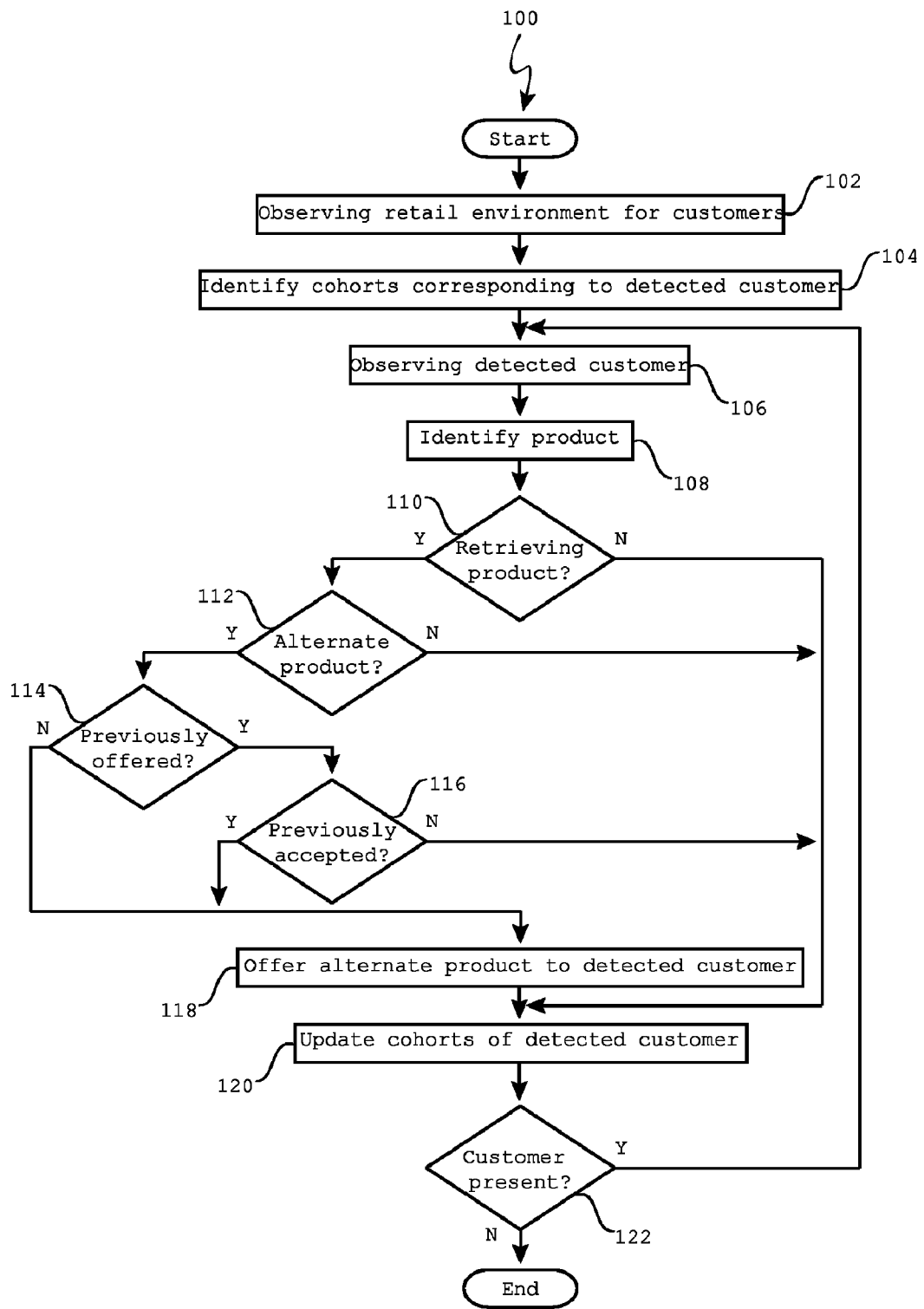
FIG. 1 illustrates a method for making an inference based on cumulative data, in accordance with embodiments of the present invention.

FIG. 1 illustrates a method 100 for making an inference based on cumulative data, in accordance with embodiments of the present invention. The method 100 begins with step 102 which comprises observing a retail environment.

A retail environment may include, inter alia, a grocery store, a clothing store, a stationary store, a shoe store, etc. Step 102 monitors the retail environment by means of video, audio, and biometric devices. For example, the video devices may be arranged to observe when a customer enters and exits the retail environment. Moreover, the video devices may observe where within a specific retail environment the customer is located.

Similarly, audio devices may detect sounds consistent with a potential customer's arrival, departure, etc. The audio devices may also identify which language a customer speaks and/or understands.

The biometric devices may include facial recognition, fingerprint scanning, hand scanning, iris scanning, etc. Again, the biometric devices are utilized by step 102 to identify customers within the retail environment.

Once a customer enters the retail environment, any one of the plethora of observation devices will identify that the customer has arrived. After completion of 102, the method 100 continues with step 104 which comprises identifying at least one cohort which corresponds to the customer.

Step 104 comprises identifying at least one cohort which corresponds to the customer. As noted supra, the term 'cohort' means a group of identifiable entities whom share at least one common characteristic. A cohort may comprise zero, one, or up to an infinite number of entities. For example, a group of six people having brown hair can be categorized as a cohort; each person corresponding to the cohort is an identifiable entity sharing the characteristic of having brown hair. Similarly, a cohort may comprise one male having brown hair, brown eyes, standing over six feet tall, and who speaks English.

The common characteristic may be, inter alia, the gender of the customer, hair color of the customer, hair length, height, weight, age, ethnicity, clothing style, clothing brand, clothing value, absence or presence of jewelry (i.e. wedding ring, eyeglasses, sunglasses, necklaces, etc.), language spoken by the customer, etc. The common characteristic may also include the mode of transportation used by the customer, the brand of vehicle the customer operates, the value of the vehicle the customer operates, the age of the vehicle the customer operates, etc. Along with identifiable entities sharing at least one common characteristic, a cohort also includes data corresponding to those entities associated with the cohort.

In one embodiment of the present invention, the data residing in the cohort is information relating to purchased product for those entities corresponding to the cohort. For example, the cohort comprising the one male having brown hair, brown eyes, standing over six feet tall, and who speaks English would also contain a history of products which the male purchased. The history or products may include, inter alia, the date of the purchase, time of the purchase, location of the purchase, quantity of the product, price of the product, the brand of product the male purchased, etc.

Once all the characteristics of the customer are observed and the corresponding cohorts are identified, step 104 is complete and the method 100 continues with step 106 which comprises observing the customer within the retail environment.

Step 106 comprises observing the customer within the retail environment. Step 106 utilizes the video, audio, and biometric devices with respect to step 102 to survey the customer's path through the retail environment. The goal of step 106 is to determine when the customer selects a product from within the retail environment. Selection may be retrieving a product, returning a product, viewing a product, etc.

For example, if the retail environment is a grocery store, step 106 will observe the customer as they progress throughout the grocery store. Step 106 continues until the customer selects a product. Once the customer selects a product, step 106 is complete and the method 100 continues with step 108 which comprises identifying the product.

Step 108 comprises identifying the product to which the detected customer selected. In one embodiment of the present invention, step 108 notes where each and every product resides within the retail environment. Coupling this information with the location of the customer pursuant to step 106, step 108 can determine with a high degree of accuracy which product the customer has selected. Step 108 may utilize the video devices supplied throughout the retail environment to visually identify the product which the customer selected. For example, the video device may read the label of a product; the video device may visually identify a barcode and look the product up. In the instance where the customer has not physically taken control of the product, the video devices may identify which shelf the customer is looking.

Similarly, if the customer is speaking the audio devices may detect what the customer is saying and that speech may be correlated to the product.

Once the product is accurately identified, step 108 is complete and the method 100 continues with step 110 which comprises determining whether the customer is retrieving or returning the product.

Step 110 comprises determining whether the customer is retrieving or returning the product. This determination is performed by utilizing the audio, video and biometric devices throughout the retail environment. Step 110 may be completed by noting where the product started and ended. For example, if the product starts on the shelf and is taken by the customer and placed in a cart, step 110 can deduce that yes the customer is retrieving the product. However, if the product starts in the customers shopping cart and ends of the shelf, step 110 may deduce that no the customer is not retrieving the product.

Primarily, the video devices will be used to determine whether the customer is retrieving the product from the shelf or returning the product to the shelf. If the customer is returning the product to the shelf within the retail environment, then step 110 returns a result of no and continues with step 120 which comprises updating the cohorts corresponding to the customer.

However, if the customer is retrieving the product from the shelf, then the method 100 continues with 112 which comprises determining whether an alternate product to that of the identified product exists within the retail environment.

Step 112 comprises determining whether an alternate product to that of the identified product exists within the retail environment. The alternate product may be, inter alia, a product similar to that of the identified product but having a superior quality, a superior value, a larger quantity, etc. The alternate product may also be produced using more exotic materials etc. Furthermore, an alternate product may also comprise a complimentary product, complimentary to that of the identified product.

For example, the customer removes from the shelf a package of Lasagna noodles, therefore the product identified is Lasagna noodles, and it is clear the customer is retrieving the product. Step 112 will search all of the cohorts to which the customer corresponds for an alternate product to Lasagna noodles; the alternate product being superior in quality, value, quantity, production, materials, etc.

If step 112 determines that there are no alternate products to that of the Lasagna noodles identified pursuant to step 108, then step 112 returns a response of no to which the method 100 continues with step 120 which comprises updating the cohorts corresponding to the customer.

However, if step 112 identifies an alternate product within the cohorts corresponding to the customer, then step 112 returns a response of yes and the method 100 continues with step 114 which comprising determining whether the alternate product was previously offered to the detected customer.

Continuing the example supra, step 112 searches all cohorts corresponding to the customer and finds alternate products including Romano cheese, Ricotta cheese, Mozzarella cheese, Spinach, Extra Virgin Olive Oil, and a superior brand of Lasagna noodle. All of these products are considered alternate products to the Lasagna noodles having been identified pursuant to step 108. Therefore, step 112 would return a response of yes and continue on to step 114.

Step 114 comprises determining whether the alternate products identified in step 112 were previously offered to the customer. Since each customer corresponds to a plurality of cohorts along with identifying enough characteristics pursuant to step 104, individual customers can be individually identified by the method 100. Therefore a unique cohort exists for each and every customer, the cohort comprising a single person having all the characteristics the customer exhibits. Within this specific cohort would reside information on the products purchased by the unique customer. Similarly, this individual cohort would also retain information on alternate products offered to, accepted and/or rejected by the customer. Therefore, when the customer retrieves the Lasagna noodles from the shelf and the alternate product of Ricotta cheese is identified pursuant to step 112, step 114 determines whether Ricotta cheese has been previously offered to the customer when the customer retrieved Lasagna noodles.

If step 114 determines that the alternate product, (i.e. Ricotta cheese) has not been previously offered to the customer, then step 114 returns a response of no and the method 100 continues with step 118 which comprises offering the alternate product to the customer.

However, if step 114 determines by reviewing the data residing in the individual cohort corresponding to the customer that the alternate product was previously offered to the customer when retrieving Lasagna noodles, step 114 returns a response of yes and the method 100 continues with step 116 which comprises determining whether the customer previously accepted an offer for the alternate product.

Step 116 comprises determining whether the customer previously accepted a previous offer of the alternate product. Within the individual cohort corresponding to the customer is a list of alternate products and the result of offering each alternate product to the customer. Therefore, step 116 reviews the individual cohort corresponding to the customer to identify whether the previously offered alternate product (i.e. ricotta cheese) was accepted by the customer. Acceptance of the offer would include finding the alternate product in the retail environment and purchasing the alternate product.

If the customer did not purchase the alternate product in conjunction with the original product, then step 116 returns a response of no and the method 100 continues with step 120 which comprises updating the cohorts corresponding to the customer. However, if the customer did purchase the alternate product in addition to the original product, step 116 returns a response of yes and the method 100 continues with step 118 which comprises offering the alternate product to the customer.

Step 118 comprises offering the alternate product to the customer. Throughout the retail environment, in addition to the audio and video and biometric devices, are video screens, speakers, and coupon dispensers. The offer may be sent to the video screens in the closest proximity to the customer. Since the method 100 knows the location of the customer within the retail environment pursuant to step 106, identifying the closest video screen is a trivial determination.

In an alternative embodiment of the present invention, the offer comprises spoken words sent to the speakers in the closest proximity to the customer. The language in which the offer is provided is consistent with the language identified which the customer speaks and/or understands pursuant to step 104.

In another alternative embodiment of the present invention, the offer comprises a coupon printed from the coupon dispenser in the closest proximity to the customer.

Therefore, when the customer removes the Lasagna noodles from the shelf, step 118 may visually display the ricotta cheese to the customer. Similarly, if a speaker system is involved, step 118 may audibly offer the ricotta cheese in conjunction with the Lasagna noodles. Finally, by use of a coupon device or printout device, when the customer removes the Lasagna noodles from the shelf, a coupon or information may be printed out which offers the ricotta cheese to the customer.

It is of special note that steps 108 through 118 collectively comprise a step of making an inference based on cumulative data. The cumulative data comprises the information residing in the cohorts corresponding to the customer as well as the characteristics separating the individual cohorts. The inference is that since similar customers purchased an alternate product then the current customer will purchase also likely purchase the alternate product. As the method 100 collects additional cumulative data the inference capabilities will increase for the method 100 will observe more customers' purchasing preferences and can infer with a greater accuracy.

After completion of step 118, the method 100 continues with step 120 which comprises updating the cohorts corresponding to the customer.

Step 120 comprises obtaining the cohorts corresponding to the customer. Each cohort of the at least one cohort are updated in one of two different manners. First, the cohorts are updated with respect to the identified product pursuant to step 108. For example, when the customer remove the Lasagna noodles from the shelf, step 120 will update all the cohorts corresponding to the customer to therein identify those individuals who maintain a characteristic to which the customer also maintains similarly purchase Lasagna noodles.

Additionally, if an alternate product was detected and either never offered or previously offered and accepted by the customer, the alternate product will also be included in the cohorts to which the customer corresponds. Therefore, when the customer retrieves the Lasagna noodles and is offered the Ricotta cheese and when the customer retrieves the ricotta cheese, this information will be stored in the cohorts to which the customer corresponds.

Similarly, if the customer refuses and/or does not purchase the alternate product, this fact is stored in the cohorts for future use. Thus, the cohorts would comprise information that when the customer retrieved Lasagna noodles they were offered Ricotta cheese. In addition, the customer did not purchase the Ricotta cheese after receiving the offer. This information is stored in order to better provide appropriate alternate products to the customers in the future.

After completion of step 120, the method 100 continues with step 122 which comprises determining whether the customer is still present within the retail environment.

Step 122 comprises determining whether the customer remains present within the retail environment. The determination pursuant to step 122 is facilitated by use of the audio, video, and biometric devices used to observe the retail environment 102. If the audio, video, and biometric devices detect the customer's presence (i.e. can identify the customer within the retail environment), step 102 returns a response of yes and the method 100 returns to step 106 comprising observing the detected customer.

However, if the customer is no longer present and/or detectable within the retail environment, step 122 returns a response of no and the method 100 ends.

For example, once the customer puts all the products they wish to purchase into a cart, a bag, a basket etc. and purchases the products and furthermore leaves the retail environment, the method would notice the absence of a customer and cease observing and/or detecting this customer pursuant to step 106.

Figure 2:
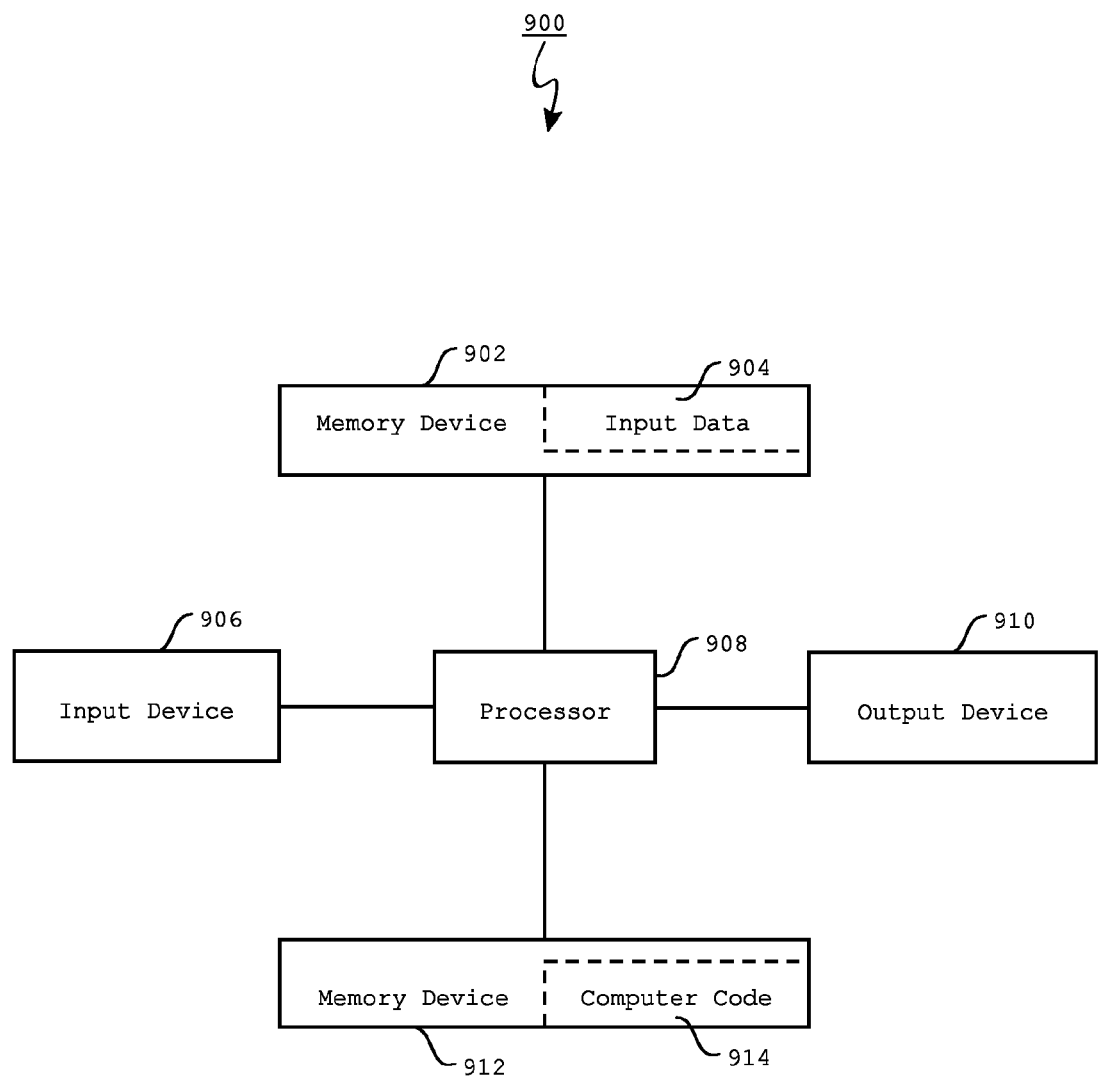
FIG. 2 illustrates a computer system which may facilitate a method for making an inference based on cumulative data, in accordance with embodiments of the present invention.

FIG. 2 illustrates a computer system 900 which may facilitate a method for making an inference based on cumulative data, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for making an inference based on cumulative data according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 2) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for making an inference based on cumulative data. Thus, the present invention discloses a process for supporting computer infrastructure, comprising integrating, hosting, maintaining and deploying computer-readable code into a computing system (e.g., computing system 900), wherein the code in combination with the computing system is capable of performing a method for making an inference based on cumulative data.

In another embodiment, the invention provides a business method that performs the process steps of the invention on a subscription, advertising and/or fee basis. That is, a service provider, such as a Solution Integrator, can offer to create, maintain, support, etc. a process for making an inference based on cumulative data. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 2 shows the computer system 900 as a particular configuration of hardware and software, any configuration of hardware and software, as would be known to a person of ordinary skill in the art, may be utilized for the purposes stated supra in conjunction with the particular computer system 900 of FIG. 2. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for making an inference based on cumulative data, said method comprising:
    observing a retail environment for a customer, said observing utilizing at least one device selected from the group comprising video and audio and biometric devices;
    in response to having identified said at least one customer, identifying at least one cohort corresponding to said customer, each cohort of said at least one cohort comprising a group of identifiable entities sharing at least one common characteristic, each cohort of said at least one cohort further comprising cumulative data corresponding to purchases made in said retail environment by each identifiable entity in said group corresponding to said cohort;
    in response to having identified said at least one cohort corresponding to said customer, identifying at least one product said customer selected from said retail environment;
    in response to having identified said at least one product, a computer processor making an inference based on said at least one product and said cumulative data residing in each cohort of said at least one cohort corresponding to said customer; and
    in response to said making said inference, updating said cumulative data residing in each cohort of said at least one cohort corresponding to said customer, said updating comprising utilizing said inference.

2. The method of claim 1, said making said inference comprising:
    determining whether said customer is retrieving or returning said selected product; and
    in response to having determined said customer is returning said selected product, inferring that entities sharing at least one common characteristic with said customer would likewise return said selected product.

3. The method of claim 1, said making said inference comprising:
    determining whether said customer is retrieving or returning said selected product; and
    in response to having determined said customer is retrieving said selected product, determining whether at least one alternate product to said selected product resides in said retail environment, said at least one alternate product corresponding to at least one product identified in any cohort of said at least one cohort.

4. The method of claim 3, said method having determined that said at least one alternate product resides in said retail environment:
    determining whether said at least one alternate product was previously offered to said customer; and
    in response to having determined that said at least one alternate product was not previously offered to said customer, offering said at least one alternate product to said customer, said offering comprising sending information to said customer relating to said at least one alternate product.

5. The method of claim 3, said method having determined that said at least one alternate product resides in said retail environment:
    determining whether said at least one alternate product was previously offered to said customer; and
    in response to having determined that said at least one alternate product was previously offered to said customer, determining whether said customer purchased said alternate product in response to said previous offer for said at least one alternate product.

6. The method of claim 5, said method having determined that said customer purchased said alternate product in response to said previous offer for said at least one alternate product:
    offering said at least one alternate product to said customer, said offering comprising sending information to said customer relating to said at least one alternate product; and
    inferring that entities sharing at least one common characteristic with said customer would likewise accept an offer for said alternate product.

7. The method of claim 5, said method having determined that said customer did not purchase said alternate product in response to said previous offer for said at least one alternate product:
    inferring that entities sharing at least one common characteristic with said customer would likewise not accept an offer for said alternate product.

8. A computer program product, comprising a computer-readable tangible storage device having a computer-readable program code stored therein, said computer-readable program code containing instructions that when executed by a processor of a computer system implement a method for making an inference based on cumulative data, said method comprising:

observing a retail environment for a customer, said observing utilizing at least one device selected from the group comprising video and audio and biometric devices;

in response to having identified said at least one customer, identifying at least one cohort corresponding to said customer, each cohort of said at least one cohort comprising a group of identifiable entities sharing at least one common characteristic, each cohort of said at least one cohort further comprising cumulative data corresponding to purchases made in said retail environment by each identifiable entity in said group corresponding to said cohort;

in response to having identified said at least one cohort corresponding to said customer, identifying at least one product said customer selected from said retail environment;

in response to having identified said at least one product, making an inference based on said at least one product and said cumulative data residing in each cohort of said at least one cohort corresponding to said customer; and in response to said making said inference, updating said cumulative data residing in each cohort of said at least one cohort corresponding to said customer, said updating comprising utilizing said inference.

9. The computer program product of claim 8, said making said inference comprising:

determining whether said customer is retrieving or returning said selected product; and in response to having determined said customer is returning said selected product, inferring that entities sharing at least one common characteristic with said customer would likewise return said selected product.

10. The computer program product of claim 8, said making said inference comprising:

determining whether said customer is retrieving or returning said selected product; and in response to having determined said customer is retrieving said selected product, determining whether at least one alternate product to said selected product resides in said retail environment, said at least one alternate product corresponding to at least one product identified in any cohort of said at least one cohort.

11. The computer program product of claim 10, said method having determined that said at least one alternate product resides in said retail environment:

determining whether said at least one alternate product was previously offered to said customer; and in response to having determined that said at least one alternate product was not previously offered to said customer, offering said at least one alternate product to said customer, said offering comprising sending information to said customer relating to said at least one alternate product.

12. The computer program product of claim 10, said method having determined that said at least one alternate product resides in said retail environment:

determining whether said at least one alternate product was previously offered to said customer; and in response to having determined that said at least one alternate product was previously offered to said customer, determining whether said customer purchased said alternate product in response to said previous offer for said at least one alternate product.

13. The computer program product of claim 12, said method having determined that said customer purchased said alternate product in response to said previous offer for said at least one alternate product:

offering said at least one alternate product to said customer, said offering comprising sending information to said customer relating to said at least one alternate product; and inferring that entities sharing at least one common characteristic with said customer would likewise accept an offer for said alternate product.

14. The computer program product of claim 12, said method having determined that said customer did not purchase said alternate product in response to said previous offer for said at least one alternate product:

inferring that entities sharing at least one common characteristic with said customer would likewise not accept an offer for said alternate product.

15. A computing system comprising a processor coupled to a computer-readable memory unit, said memory unit comprising a software application, said software application comprising instruction that when executed by said processor, implement a method for making an inference based on cumulative data, said method comprising:

observing a retail environment for a customer, said observing utilizing at least one device selected from the group comprising video and audio and biometric devices;

in response to having identified said at least one customer, identifying at least one cohort corresponding to said customer, each cohort of said at least one cohort comprising a group of identifiable entities sharing at least one common characteristic, each cohort of said at least one cohort further comprising cumulative data corresponding to purchases made in said retail environment by each identifiable entity in said group corresponding to said cohort;

in response to having identified said at least one cohort corresponding to said customer, identifying at least one product said customer selected from said retail environment;

in response to having identified said at least one product, making an inference based on said at least one product and said cumulative data residing in each cohort of said at least one cohort corresponding to said customer; and in response to said making said inference, updating said cumulative data residing in each cohort of said at least one cohort corresponding to said customer, said updating comprising utilizing said inference.

16. The computing system of claim 15, said making said inference comprising:

determining whether said customer is retrieving or returning said selected product; and in response to having determined said customer is returning said selected product, inferring that entities sharing at least one common characteristic with said customer would likewise return said selected product.

17. The computing system of claim 15, said making said inference comprising:

determining whether said customer is retrieving or returning said selected product; and in response to having determined said customer is retrieving said selected product, determining whether at least one alternate product to said selected product resides in said retail environment, said at least one alternate product corresponding to at least one product identified in any cohort of said at least one cohort.

18. The computing system of claim 17, said method having determined that said at least one alternate product resides in said retail environment:
- determining whether said at least one alternate product was previously offered to said customer; and
- in response to having determined that said at least one alternate product was not previously offered to said customer, offering said at least one alternate product to said customer, said offering comprising sending information to said customer relating to said at least one alternate product.

19. The computing system of claim 17, said method having determined that said at least one alternate product resides in said retail environment:
- determining whether said at least one alternate product was previously offered to said customer; and
- in response to having determined that said at least one alternate product was previously offered to said customer, determining whether said customer purchased said alternate product in response to said previous offer for said at least one alternate product.

20. The computing system of claim 19, said method having determined that said customer purchased said alternate product in response to said previous offer for said at least one alternate product:
- offering said at least one alternate product to said customer, said offering comprising sending information to said customer relating to said at least one alternate product; and
- inferring that entities sharing at least one common characteristic with said customer would likewise accept an offer for said alternate product.

21. The computing system of claim 19, said method having determined that said customer did not purchase said alternate product in response to said previous offer for said at least one alternate product:
- inferring that entities sharing at least one common characteristic with said customer would likewise not accept an offer for said alternate product.

22. A process for supporting computer infrastructure, said process comprising providing at least one support service for at least one of creating, integrating, hosting, maintaining, and deploying computer readable code in a computing system, wherein said code in combination with the computing system implements a method for making an inference based on cumulative data, said method comprising:
- observing a retail environment for a customer, said observing utilizing at least one device selected from the group comprising video and audio and biometric devices;
- in response to having identified said at least one customer, identifying at least one cohort corresponding to said customer, each cohort of said at least one cohort comprising a group of identifiable entities sharing at least one common characteristic, each cohort of said at least one cohort further comprising cumulative data corresponding to purchases made in said retail environment by each identifiable entity in said group corresponding to said cohort;
- in response to having identified said at least one cohort corresponding to said customer, identifying at least one product said customer selected from said retail environment;
- in response to having identified said at least one product, making an inference based on said at least one product and said cumulative data residing in each cohort of said at least one cohort corresponding to said customer; and
- in response to said making said inference, updating said cumulative data residing in each cohort of said at least one cohort corresponding to said customer, said updating comprising utilizing said inference.

23. The process for supporting computer infrastructure of claim 22, said making said inference comprising:
- determining whether said customer is retrieving or returning said selected product; and
- in response to having determined said customer is returning said selected product, inferring that entities sharing at least one common characteristic with said customer would likewise return said selected product.

24. The process for supporting computer infrastructure of claim 22, said making said inference comprising:
- determining whether said customer is retrieving or returning said selected product; and
- in response to having determined said customer is retrieving said selected product, determining whether at least one alternate product to said selected product resides in said retail environment, said at least one alternate product corresponding to at least one product identified in any cohort of said at least one cohort.

25. The process for supporting computer infrastructure of claim 24, said method having determined that said at least one alternate product resides in said retail environment:
- determining whether said at least one alternate product was previously offered to said customer; and
- in response to having determined that said at least one alternate product was not previously offered to said customer, offering said at least one alternate product to said customer, said offering comprising sending information to said customer relating to said at least one alternate product.

* * * * *